United States Patent
Starov et al.

(10) Patent No.: US 10,931,688 B2
(45) Date of Patent: Feb. 23, 2021

(54) MALICIOUS WEBSITE DISCOVERY USING WEB ANALYTICS IDENTIFIERS

(71) Applicant: Palo Alto Networks, Inc., Santa Clara, CA (US)

(72) Inventors: Oleksii Starov, Santa Clara, CA (US); Yuchen Zhou, Newark, CA (US); Xiao Zhang, San Jose, CA (US); Fang Liu, Santa Clara, CA (US)

(73) Assignee: PALO ALTO NETWORKS, INC., Santa Clara, CA (US)

( * ) Notice: Subject to any disclaimer, the term of this patent is extended or adjusted under 35 U.S.C. 154(b) by 292 days.

(21) Appl. No.: 16/041,006

(22) Filed: Jul. 20, 2018

(65) Prior Publication Data

US 2019/0334936 A1 Oct. 31, 2019

Related U.S. Application Data

(60) Provisional application No. 62/662,553, filed on Apr. 25, 2018.

(51) Int. Cl.
*H04L 29/06* (2006.01)
*G06F 16/951* (2019.01)

(52) U.S. Cl.
CPC ........ *H04L 63/1416* (2013.01); *G06F 16/951* (2019.01); *H04L 63/0236* (2013.01); *H04L 63/1425* (2013.01)

(58) Field of Classification Search
CPC ............. H04L 63/1416; H04L 63/0236; H04L 63/1425; G06F 16/951
See application file for complete search history.

(56) References Cited

U.S. PATENT DOCUMENTS

| | | | | |
|---|---|---|---|---|
| 7,854,001 | B1 * | 12/2010 | Chen | H04L 41/00 726/22 |
| 8,176,556 | B1 * | 5/2012 | Farrokh | H04L 63/1483 713/188 |
| 8,291,227 | B2 * | 10/2012 | Parkinson | H04L 9/3247 380/277 |
| 8,943,588 | B1 * | 1/2015 | Speegle | H04L 63/1483 726/22 |
| 9,123,027 | B2 * | 9/2015 | Srivastava | G06F 21/56 |
| 9,231,972 | B2 * | 1/2016 | Ou | H04L 63/145 |
| 9,356,941 | B1 * | 5/2016 | Kislyuk | H04L 63/14 |

* cited by examiner

*Primary Examiner* — Hosuk Song
(74) *Attorney, Agent, or Firm* — Gilliam IP PLLC (57) ABSTRACT

The technology presented herein enables malicious websites to be discovered based on web analytics identifiers associated therewith. In a particular embodiment, a method provides obtaining information about one or more first websites that are known to be malicious. The method further provides identifying one or more first analytics identifiers that are each associated with at least one of the first websites and identifying one or more second websites that are each associated with at least one of the first analytics identifiers.

20 Claims, 8 Drawing Sheets

MALICIOUS WEBSITE DISCOVERY USING WEB ANALYTICS IDENTIFIERS

RELATED APPLICATIONS

This application is related to and claims priority to U.S. Provisional Patent Application No. 62/662,553, entitled "MALICIOUS WEBSITE DISCOVERY USING WEB ANALYTICS IDENTIFIERS," filed on Apr. 25, 2018, and which is hereby incorporated by reference in its entirety.

TECHNICAL BACKGROUND

Many websites will have malicious intent when communicating with user devices and the users of those devices. For example, a website may attempt to install malicious code (e.g., a virus, worm, or other unwanted software) onto a user's device, either via exploited vulnerability or by tricking the user to perform additional clicks, or may attempt to obtain personal information from a user by tricking the user into believing the website warrants receiving such information, which is an approach that is sometimes called phishing. Given the large number of websites on the Internet, a number which is constantly growing, identifying websites that have malicious intent is a difficult task. Likewise, some websites that were once not malicious may become malicious. Given the harm that can be caused by a malicious website, identifying as many malicious websites as possible will help prevent those malicious websites from doing further harm.

OVERVIEW

The technology presented herein enables malicious websites to be discovered based on web analytics identifiers associated therewith. In a particular embodiment, a method provides obtaining information about one or more first websites that are known to be malicious. The method further provides identifying one or more first analytics identifiers that are each associated with at least one of the first websites and identifying one or more second websites that are each associated with at least one of the first analytics identifiers.

In some embodiments, the second websites are identified by domain names and the method further provides transferring the domain names to a domain filter, wherein the domain filter identifies the domain names in network traffic. In these embodiments, upon identifying one of the domain names in the network traffic, the domain filter may provide a notification to a user indicating that the domain name is malicious. Also upon identifying one of the domain names in the network traffic, the domain filter may block the network traffic associated with the domain name.

In some embodiments, identifying the second websites includes querying a search engine with the first analytics identifiers. The search engine searches source code of a plurality of websites for the first analytics identifiers and identifies ones of the plurality of websites having one of the first analytics identifiers as the second websites.

In some embodiments, the information about the first websites includes a domain name for each of the first websites. In these embodiments, identifying the first analytics identifiers includes retrieving source code for the first websites based on the domain name for each of the first websites and extracting the first analytics identifiers from the source code for the first websites.

In some embodiments, the method further provides determining that a first portion of the first websites are whitelisted and removing the first portion from the first websites.

In some embodiments, the method further provides determining that a first portion of the first websites are inactive and removing the first portion from the first websites. In those embodiments, determining that the first portion of the first websites are inactive may include determining that each analytics identifier of the first portion is associated with greater than a threshold number of domains.

In some embodiments, the method further provides obtaining information about one or more first applications that are known to be malicious, identifying one or more second analytics identifiers that are each associated with at least one of the first applications, and identifying one or more second applications that are each associated with at least one of the second analytics identifiers.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to obtain information about one or more first websites that are known to be malicious. The program instructions further direct the processing system to identify one or more first analytics identifiers that are each associated with at least one of the first websites and identify one or more second websites that are each associated with at least one of the first analytics identifiers.

In yet another embodiment, one or more computer readable storage media is provided having program instructions stored thereon. The program instructions, when read and executed by a processing system, direct the processing system to obtain information about one or more first websites that are known to be malicious. The program instructions further direct the processing system to identify one or more first analytics identifiers that are each associated with at least one of the first websites and identify one or more second websites that are each associated with at least one of the first analytics identifiers.

DETAILED DESCRIPTION

Many, if not most, websites use third party analytics services to gather information about activity of visitors to those web sites. The information may be as simple as tracking how many people visit the website, although more detailed statistics may also be determined, such as length of time spent on any given page of a site, links selected on the website, or other information. In order for an analytics service to attribute activity to a particular website (or group of websites having a common owner, developer, or otherwise interested party), the website must be associated with an analytics identifier for the website that distinguishes the website from other websites that use the analytics service and are not also associated with the same analytics identifier (e.g., a websites outside of the website's group). An analytics identifier is passed to a web client accessing the website associated with that analytics identifier (e.g., a web browser on a user's device) so that the web client can report activity to the analytics service using the analytics identifier. The discovery of malicious websites herein uses analytics identifiers, like those discussed above, to identify malicious websites associated with those identifiers.

Figure 1:
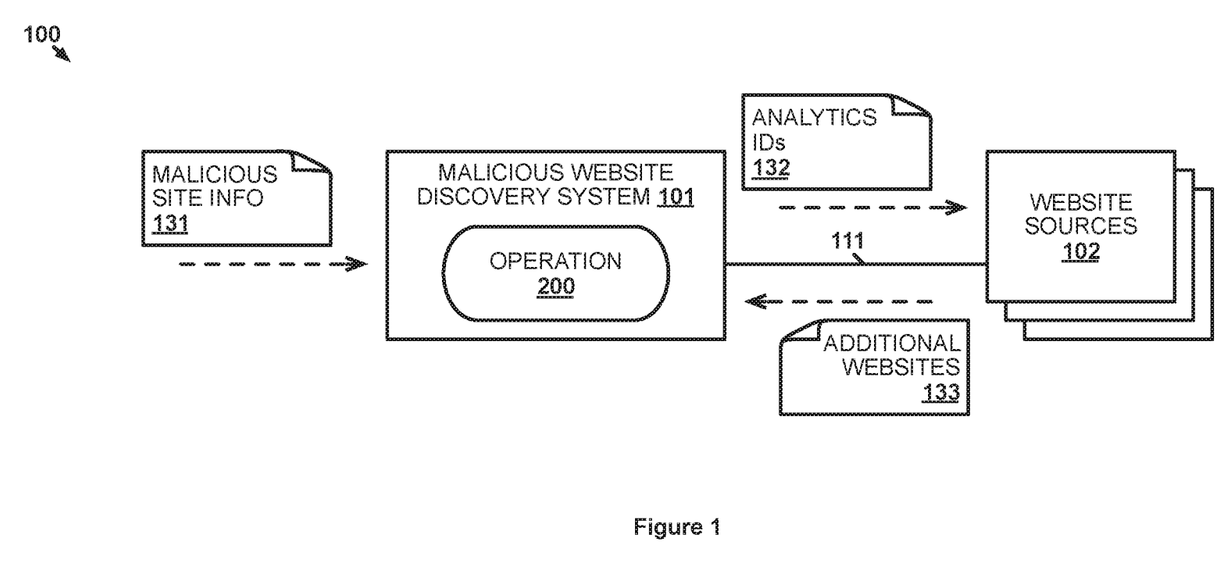
FIG. 1 illustrates an implementation for discovering malicious websites using web analytics identifiers.

FIG. 1 illustrates implementation 100 for discovering malicious websites using web analytics identifiers. Implementation 100 includes malicious website discovery system 101 and website sources 102. Malicious website discovery system 101 and website sources 102 communicate over one or more communications links 111. Communication links 111 comprise wired and/or wireless communication links and may be direct links or may include intervening systems, networks, and devices.

In operation, malicious website discovery system 101 identifies malicious websites so that actions can be taken to address the potential problems that the malicious websites may cause. For example, the websites identified by malicious website discovery system 101 may be added to a list of prohibited websites that are blocked by the firewall. As such, the firewall is more effective at protecting the user systems behind the firewall because it has a more comprehensive list of websites to be blocked.

Figure 2:
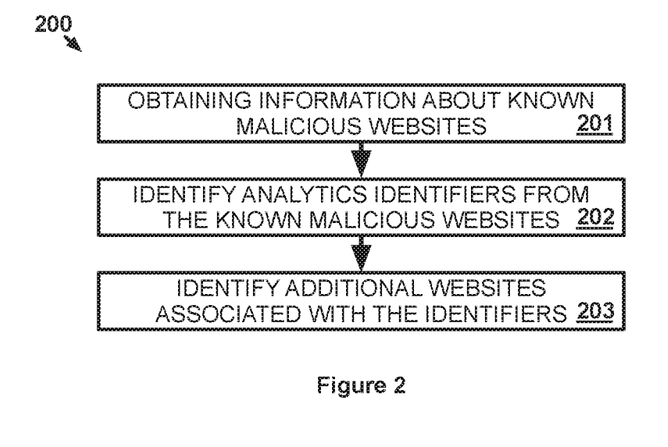
FIG. 2 illustrates an operation of the implementation to discover malicious websites using web analytics identifiers.

FIG. 2 illustrates operation 200 of implementation 100 to discover malicious websites using web analytics identifiers. Malicious website discovery system 101 obtains malicious website information 131 about websites that are known to be malicious (201). The information may be obtained from a third party that determined that the websites were malicious using traditional methods. Malicious website information 131 includes at least one analytics identifier for each website that had an analytics identifier in its code and are therefore associated therewith (some websites may not use a website analytics service and, therefore, would not include an analytics identifier).

Malicious website discovery system 101 identifies analytics identifiers 132 that are each associated with a malicious website having information within malicious website information 131 (202). It is possible that a unique analytics identifier may be associated with more than one website. Thus, analytics identifiers 132 preferably does not include duplicate analytics identifiers. An analytics identifier may be associated with more than one website when analytics are desired across multiple websites rather than for a single website. For example, a developer of malicious websites may use multiple websites for the developer's malicious activities in order to broaden the potential reach of those malicious activities. The developer likely cares more about the activities across all of those malicious websites to get a complete picture of the malicious activities and will therefore associate the same analytics identifier with each of the malicious websites.

Malicious website discovery system 101 uses analytics identifiers 132 to identify one or more additional malicious websites 133 that are likewise associated with one of analytics identifiers 132 (203). Malicious website discovery system 101 interacts with website sources 102 to identify additional malicious websites 133. At least a portion of website sources 102 may comprise one or more web servers for websites that malicious website discovery system 101 crawls itself to determine whether the websites hosted by those web servers include any one of analytics identifiers 132 in their code. Malicious website discovery system 101 may maintain a searchable index of the analytics identifiers associated with previously crawled websites so that malicious website discovery system 101 does not need to re-crawl all of those websites when processing analytics identifiers 132. If one of analytics identifiers 132 is found in the index, then malicious website discovery system 101 identifies the website associated with that one analytics identifier in the index as being one of additional malicious websites 133. Similarly, at least a portion of website sources 102 may include one or more other systems that themselves crawl web servers and at least identify the analytics identifiers included in the code of the crawled websites (e.g., a search engine that indexes analytics identifiers 132). Malicious website discovery system 101 searches each index to find whether any of analytics identifiers 132 are located therein and identifies the websites associated with those found analytics identifiers in the index as being malicious websites for inclusion in additional malicious websites 133. Of course, when identifying additional malicious websites 133, malicious website discovery system 101 may come across websites already identified as being malicious by malicious website information 131 or were otherwise previously identified to malicious website discovery system 101 as being malicious. In those cases, malicious website discovery system 101 may ignore those already identified websites.

Advantageously, operation 200 is able to identify additional malicious websites 133 by assuming websites that share an analytics identifier with known malicious websites are also malicious. For instance, continuing the malicious website developer example from above, malicious website information 131 may only identify a portion of the developer's malicious websites and the analytics identifier associated therewith, which is included by malicious website discovery system 101 in analytics identifiers 132. Malicious website discovery system 101 is able to identify more, if not all, of the developer's other malicious websites that share a common analytics identifier with the already identified portion of the developer's websites. In some examples, malicious website discovery system 101 may perform further processing on the discovered websites to better insure against malicious website discovery system 101 falsely identifying a non-malicious website as malicious.

Figure 3:
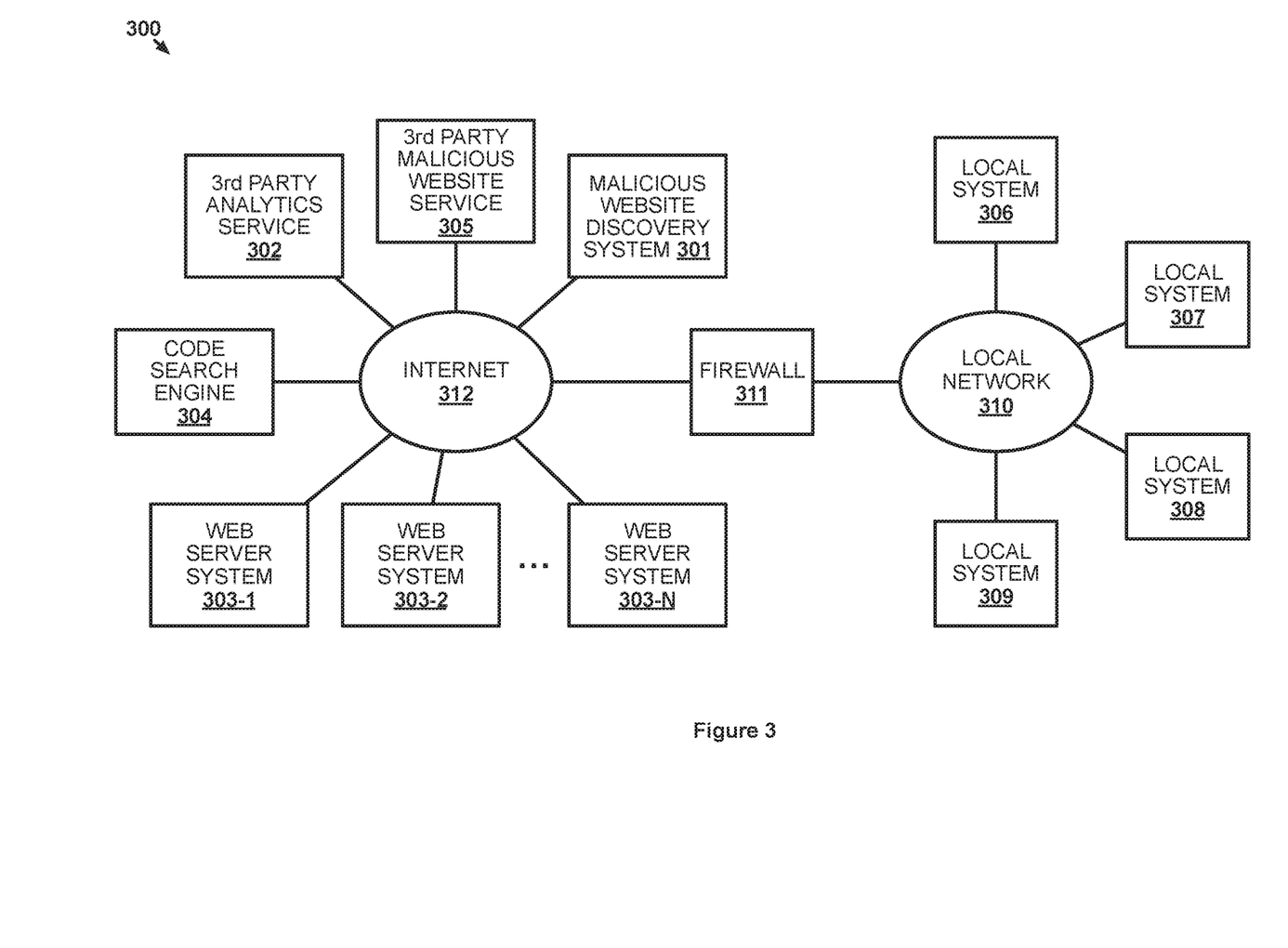
FIG. 3 illustrates another implementation for discovering malicious websites using web analytics identifiers.

FIG. 3 illustrates implementation 300 for discovering malicious websites using web analytics identifiers. Implementation 300 includes malicious website discovery system 301, 3rd party analytics service 302, web server systems 303, code search engine 304, 3rd party malicious website service 305, local systems 306-309, local network 310, firewall 311, and Internet 312. While shown outside of local network 310, one or more of malicious website discovery system 301, web server systems 303, and code search engine 304 may be on local network 310 as well.

In operation, web server systems 303 provide data for websites, web-based applications, or some other type of web-based information accessible by computing systems over Internet 312, such as local systems 306-309. Firewall 311 regulates communications entering and exiting local network 310. Firewall 311 in this example is capable of identifying communications associated with a particular domain name. For instance, firewall 311 may be able to identify a domain name in a DNS request and block the DNS request if the domain name is known by firewall 311 to be a malicious domain. Malicious website discovery system 301 provides information indicating at least a portion of the malicious domains used by firewall 311 to determine whether communication traffic should be blocked. Blocking communication traffic based on domain names allows firewall 311 to protect against malicious domains even though the IP addresses associated with the malicious domains may change.

Figure 4:
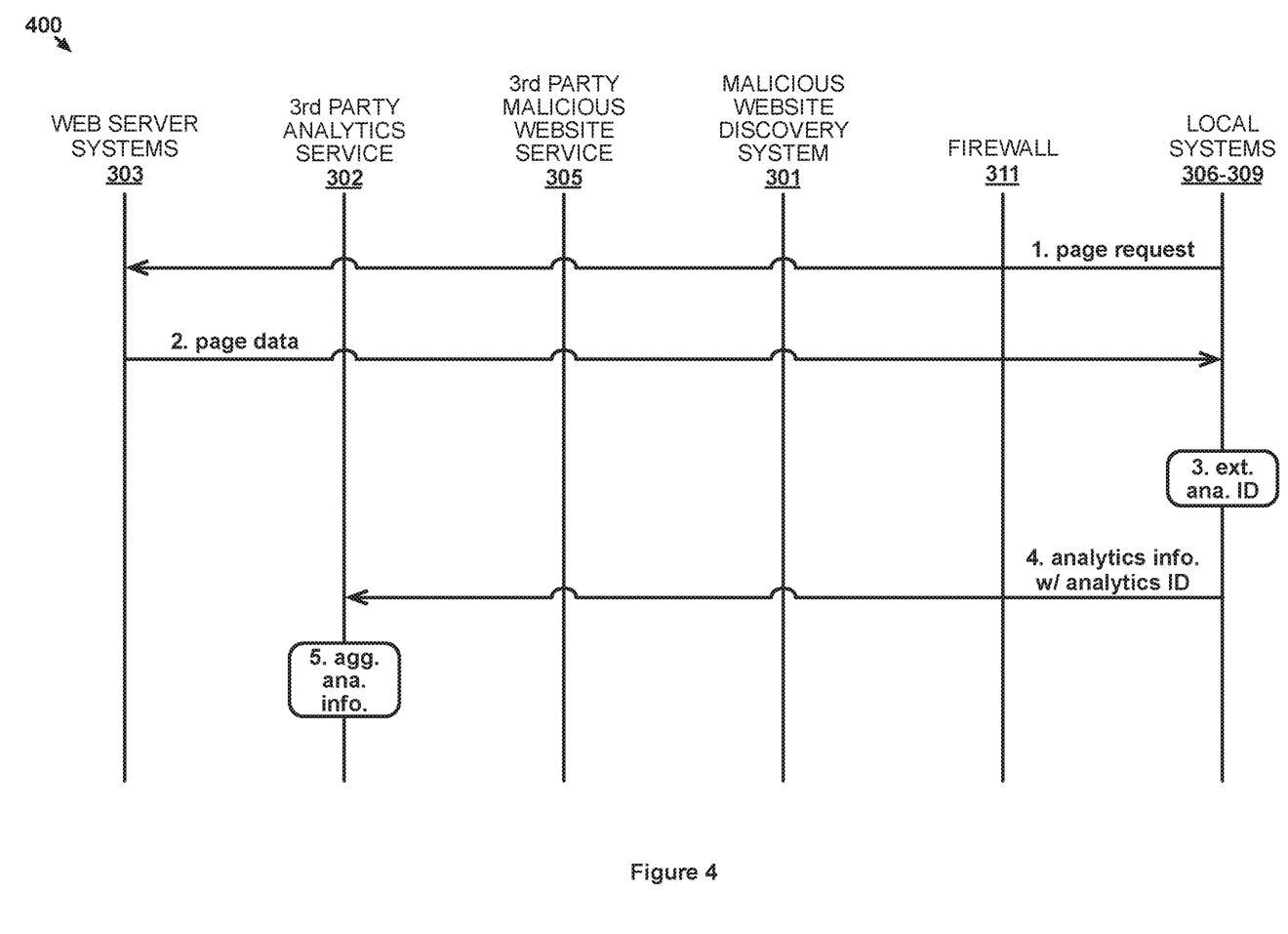
FIG. 4 illustrates an operational scenario for the other implementation to discover malicious websites using web analytics identifiers.

FIG. 4 illustrates operational scenario 400 for implementation 300 to discover malicious websites using web analytics identifiers. Operational scenario 400 describes how an analytics identifier can be useful for finding additional malicious websites. Specifically, one of local systems 306-309 transfers a page request at step 1 to one of web server systems 303 to request page data representing a webpage. While one of local systems 306-309 is used for the purposes of this example, systems elsewhere on Internet 312 may perform similarly to that described in operational scenario 400. The page data in this case includes at least source code (e.g., code written in Hypertext Markup Language) for the webpage but may also include data for images, or other types of media to be presented as part of the webpage, or code for other elements presented as part of the webpage once rendered, such as code for plugins. In some cases, page data may be obtained from multiple sources instead of a single one of web server systems 303.

Upon receiving the page data transferred at step 2, the requesting one of local systems 306-309 extracts an analytics identifier from the page data at step 3. The format of the analytics identifier may imply that the analytics identifier is one associated with 3rd party analytics service 302 (i.e., different 3rd party analytics services may use different formats) but, more likely, the page data further includes identification information for 3rd party analytics service 302, such as a uniform resource locator (URL), network address, or other type of information that may be needed to identify and communicate with one or more computing systems of 3rd party analytics service 302. In some example, the page data includes code, such as JavaScript code, with the analytics identifier that 3rd party analytics service 302 requires be inserted into webpages that use the service. The page data may further indicate what type of analytics information the 3rd party analytics service 302 would like to receive, at least the types of analytics information, if any, that cannot be gleaned from communication packets exchanged with 3rd party analytics service 302, or 3rd party analytics service 302 may request the analytics information upon a connection being established with the one of local systems 306-309. The one of local systems 306-309 transfers the analytics information and associates the analytics information with the extracted analytics identifier at step 4.

Upon receiving the analytics information, 3rd party analytics service 302 can aggregate the analytics information at step 5 with other analytics information received from other systems in association with the analytics identifier. The analytics identifier may be associated with only the website having the webpage being requested in operational scenario 400 or may be associated with multiple websites. The association with multiple websites is what allows malicious website discovery system 301 to discover malicious websites. For example, a particular malicious actor (e.g., web developer) may operate multiple websites that have a malicious intent as part of a malicious campaign. The malicious actor may desire to aggregate analytics across all of those websites to get an overall picture of the malicious campaign. A single analytics identifier will therefore be used with all of the malicious websites. If even one website using a particular analytics identifier is known, malicious website discovery system 301 can effectively assume that other websites using that analytics identifier are also malicious, as discussed in more detail below.

It should be understood that operational scenario 400 is merely one example of how a third-party analytics service collects analytics information associated with a particular analytics identifier. Other manners of collecting analytics information may be used instead and different analytics services may operate differently from one another.

Figure 5:
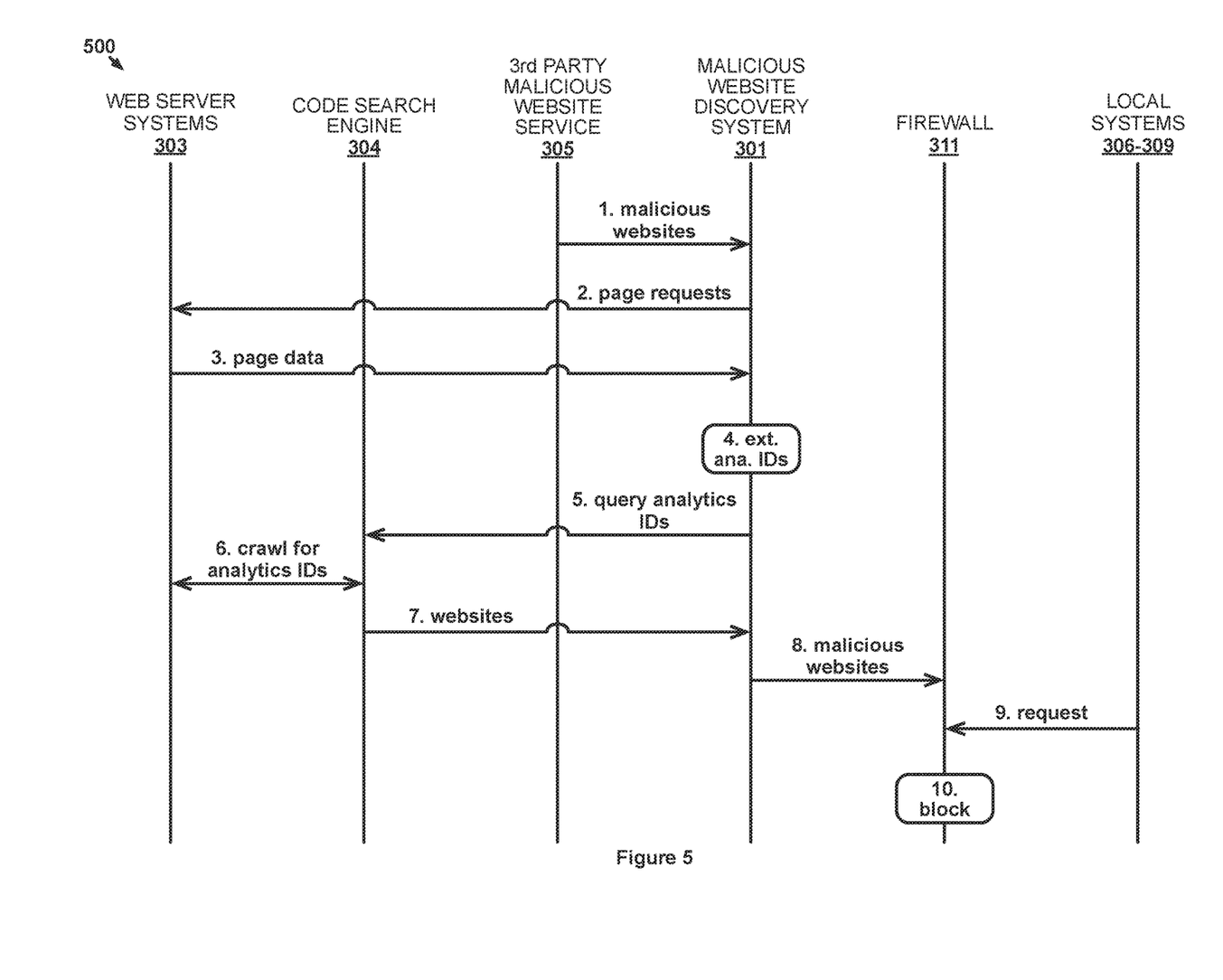
FIG. 5 illustrates another operational scenario for the other implementation to discover malicious websites using web analytics identifiers.

FIG. 5 illustrates operational scenario 500 for implementation 300 to discover malicious websites using web analytics identifiers. In operational scenario 500, malicious website discovery system 301 is seeded with websites known to be malicious by having the identity of those websites transferred at step 1 from 3rd party malicious website service 305. 3rd party malicious website service 305 may use any method to identify the known malicious websites that are sent to malicious website discovery system 301. 3rd party malicious website service 305 may transfer all known malicious websites or may merely transfer the identities of changes to the known malicious websites since 3rd party malicious website service 305 last transferred known malicious websites to malicious website discovery system 301. The known malicious websites may each be identified by a domain name, URL, or some other type of website identifier.

In some cases, 3rd party malicious website service 305 may provide, either automatically or upon request from malicious website discovery system 301, one or more analytics identifiers associated with each identified known malicious website. However, in this example, malicious website discovery system 301 obtains the analytics identifiers itself. The process used by malicious website discovery system 301 to obtain the analytics identifiers for the known malicious websites is very similar to the process used by the one of local systems 306-309 to retrieve the page data in operational scenario 400. Malicious website discovery system 301 requests each of the malicious websites at step 2 from whichever of web server systems 303 serves each respective website. The page data for each respective known malicious website is transferred at step 3 to malicious website discovery system 301. Upon receiving the page data, malicious website discovery system 301 is able to extract the analytics identifiers therein at step 4 in much the same way the local system did from the page data in operational scenario 400.

While page data is used in this example, other examples may use different sources for extracting the analytics identifier. For instance, analytics identifiers may be found in traffic exchanged with respect to the webpage, such as in parameters of HTTP requests, JavaScript variables available on the rendered webpage (which may require malicious website discovery system 301 to render the webpage from the page data), or from some other source that would otherwise be accessible to a system requesting the webpage. The source of the analytics identifier may differ between 3rd party analytics services such that malicious website discovery system 301 can use whichever method is easiest for each service.

Each requested webpage may include more than one analytics identifier. In some cases, a webpage may not have any analytics identifiers, at least no analytics identifiers that are recognized by malicious website discovery system 301 and that particular webpage may therefore not factor into malicious website discovery system 301's analysis. Malicious website discovery system 301 may further simulate interaction with the webpages represented by the received page data. That is, malicious website discovery system 301 may select links or interact with other page elements to obtain additional page data stemming from those interactions and may contain one or more additional analytics identifiers. For example, the initial page data transferred for a website from web server system 303-1 may include one analytics identifier and following a link to a second page of the website may cause web server system 303-1 to provide page data for that second page that includes a different analytics identifier.

Malicious website discovery system 301 queries code search engine 304 with the analytics identifiers at step 5. Code search engine 304 crawls websites served by web server systems 303 at step 6 and indexes the information in the code for each website so that the information can be searched. The indexed code may include the source code of the website along with code used for elements within the website. While this example uses the computing systems of code search engine 304, malicious website discovery system 301 may perform at least a portion of the crawling and indexing itself in other examples. Also, while step 6 is shown in sequence as occurring after receiving the queries from malicious website discovery system 301 at step 5, it should be understood that code search engine 304 may be continually crawling websites in order to maintain an up-to-date index.

Code search engine 304 returns to malicious website discovery system 301 at step 7 the identities of websites found to have one or more of the analytics identifiers from the queries of malicious website discovery system 301. Like 3rd party malicious website service 305, code search engine 304 may identify the websites by a domain name, URL, or some other type of website identifier. In some cases, if the websites are not transferred on an individual query basis (i.e., in response to a single analytics identifier query), search engine 304 may further indicate which of the queried identifiers where found in which identified websites.

After receiving the identified websites, malicious website discovery system 301 at step 8 provides the identified websites to firewall 311 as being malicious websites that should be blocked. In some examples, the identified websites may be filtered for false positives before being transferred to firewall 311 (e.g., the identified websites may be compared against a whitelist of known benign web sites, such as the 100,000 most popular websites). Similarly, malicious website discovery system 301 may crawl at least a portion of the malicious websites itself before sending them to firewall 311. Such a step allows malicious website discovery system 301 to confirm the results from code search engine 304.

The malicious websites may be identified to 3rd party malicious website service 305 by their respective domain names, URLs, or other type of website identifier. When one of local systems 306-309 attempts to transfer data at step 9 to one of the malicious websites (e.g., transfers a DNS request for one of the malicious websites), firewall 311 can recognize the malicious website therein (e.g., through packet inspection techniques) and block the request from leaving local network 310 at step 10. In some examples, firewall 311 may also transfer a notification back to the one of local systems 306-309. The notification may indicate that the transfer was blocked and may indicate that the requested website is known to be malicious.

It should be understood that the malicious domains discovered by malicious website discovery system 301 in the above example may be used in other capacities, such as notifying a network administrator for local network 310 that the new malicious websites have been discovered. In further examples, malicious websites having the same analytics identifier may be grouped because the common use of an analytics identifier may indicate that the malicious websites are all part of a malicious campaign distributed across multiple websites.

In some examples, the operational scenarios described above may be performed slightly differently to identify phishing websites, which replicate popular benign web services. In these examples, a malicious website may include analytics identifiers from the target website the malicious website is trying to replicate (e.g., due to simply copying the target websites code and not removing the analytics identifiers therein). As such, the analytics identifiers from the target website, though benign, may be extracted as though the target website is one of the known malicious websites. Using the scenarios described above, malicious website discovery system 301 finds other websites that are using the same analytics identifier but are not associated with the target website (e.g., unlabeled websites). Additional or different filters than those above may be used to avoid false positives, such as only keeping those websites with similar web address but with different (downgraded) top level domains from the target website (e.g., .com vs. .xyz or .online).

While the above examples focus on analytics identifiers used in the context of websites, it should be understood that analytics identifiers may be used to for providing analytics in other scenarios. In one example, mobile phone and tablet applications are widely used and may use analytics to gather information about an application's usage. The application package (e.g., the Android PacKage (APK)) for a known malicious application may be requested and received in much the same way page data is requested and received by malicious website discovery system 301. The analytics identifier is then extracted from the application package, which may include malicious website discovery system 301 needing to first unpack the application package where the analytics identifier may be in the application's metadata. Malicious website discovery system 301 can then search for other applications that also used the extracted analytics identifier Like with the websites discussed above, malicious website discovery system 301 may search the application packages of other applications itself or may use a 3rd party. In another example, malicious website discovery system 301 may download known malicious browser extensions and extract the analytics identifiers in the packages for those browser extensions. As with the other examples herein, the analytics identifiers can then be searched in other browser extensions to identify other malicious browser extensions. In some examples, extensions or applications with a user base above a threshold number of users (e.g., 4 million users) may be filtered out as being false positives since, presumably, that many users would not all download malicious software. Essentially, everything performed with respect to the websites and page data in the above examples can also be performed with the extensions and application packages discussed above.

Figure 6:
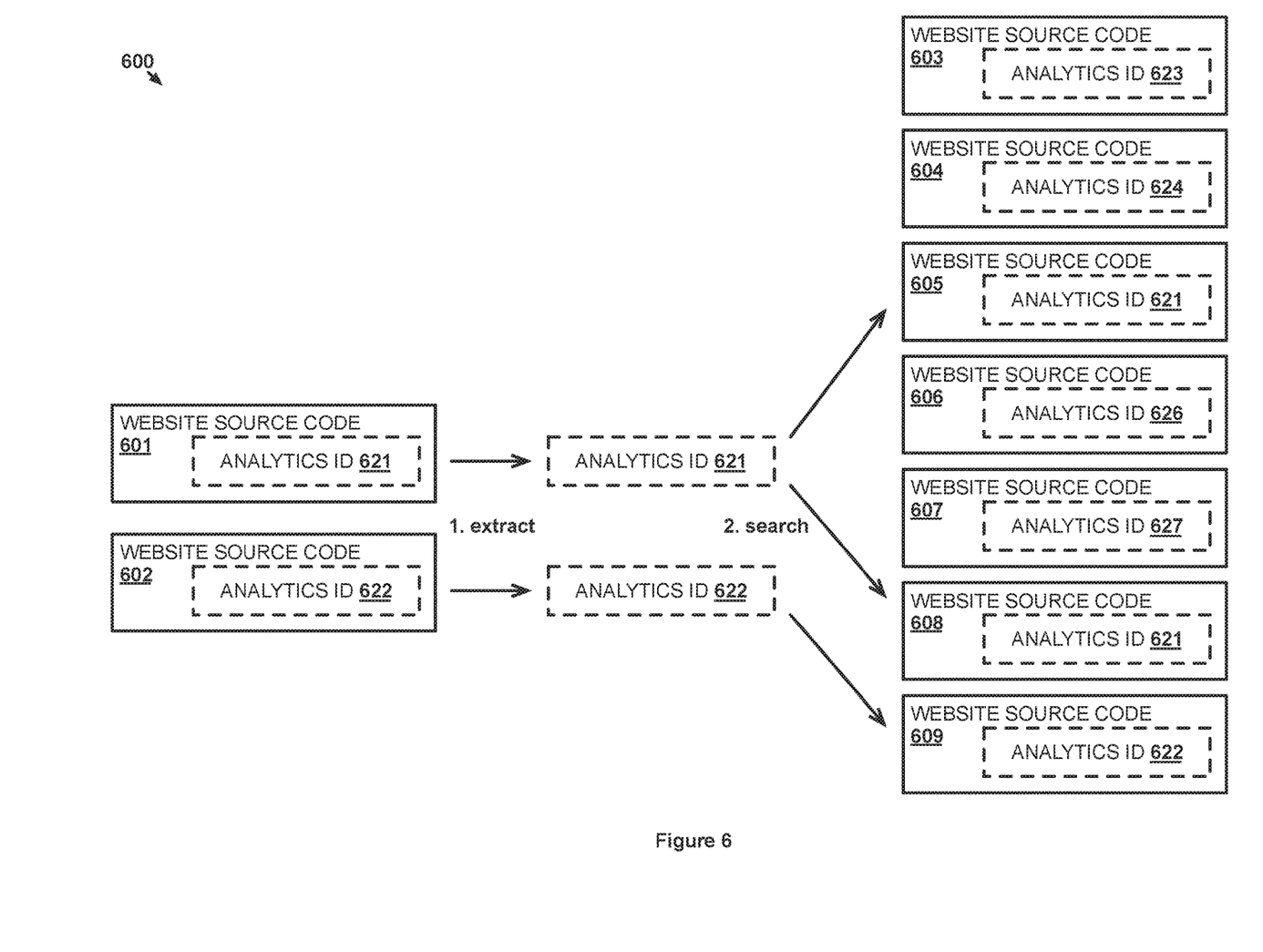
FIG. 6 illustrates yet another operational scenario for the other implementation to discover malicious websites using web analytics identifiers.

FIG. 6 illustrates operational scenario 600 for implementation 300 to discover malicious websites using web analytics identifiers. In particular, operational scenario 600 provides visualization of what occurs during steps 4-7 of operational scenario 500. Website source code 601 and website source code 602 are examples of what may be received by 301 in the page data requested from web server systems 303. Website source code 601 is the source code of one website identified by 3rd party malicious website service 305 and website source code 602 is the source code of another website identified by 3rd party malicious website service 305. Malicious website discovery system 301 searches website source code 601 and website source code 602 for analytics identifiers located therein to extract analytics identifier 621 and analytics identifier 622 at step 1. Malicious website discovery system 301 may locate analytics identifier 621 and analytics identifier 622 by searching website source code 601 and website source code 602 for information having the format of analytics identifiers used by 3rd party analytics service 302 (e.g., four letters followed by a dash and then four numbers), for code that provides instructions for communicating with 3rd party analytics service 302 (e.g., analytics identifiers would be located and possibly explicitly identified in this code), or for some other indicator that an analytics identifier is present. In other examples, malicious website discovery system 301 may support 3rd party analytics services other than 3rd party analytics service 302 and may therefore search for analytics identifiers in the formats of those services and code instructions for communicating with those services in addition to the format and instructions for 3rd party analytics service 302.

Once identified and extracted, malicious website discovery system 301 searches at step 2 for other websites that use analytics identifier 621 and analytics identifier 622 by querying code search engine 304 with analytics identifier 621 and analytics identifier 622. Responsively, code search engine 304 searches website source code 603-609 for analytics identifier 621 and analytics identifier 622. It should be understood that, while the source code of seven websites is searched in operational scenario 600, any number of websites' source code may be searched (most likely an exponentially larger number of websites given the number of websites currently on the Internet). In this example, code search engine 304 finds analytics identifier 621 in website source code 605 and website source code 608 and finds analytics identifier 622 in website source code 609. The identities of the web sites with respective website source code 605, website source code 608, and website source code 609 are returned to malicious website discovery system 301 in response to malicious website discovery system 301's search query, or queries if analytics identifier 621 and analytics identifier 622 were part of different queries.

Figure 7:
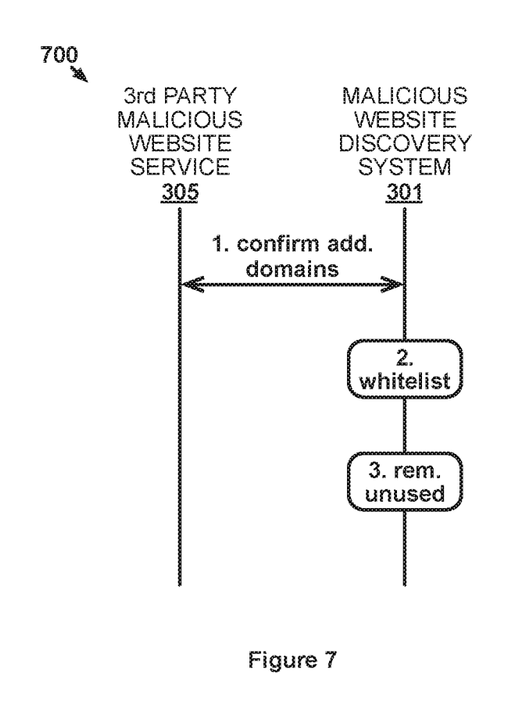
FIG. 7 illustrates one more operational scenario for the other implementation to discover malicious websites using web analytics identifiers.

FIG. 7 illustrates operational scenario 700 for implementation 300 to discover malicious websites using web analytics identifiers. Operational scenario 700 may be performed before malicious website discovery system 301 queries code search engine 304 at step 5 of operational scenario 500 to filter out false positives in the known malicious websites received from 3rd party malicious website service 305. Filtering out false positives at that time is beneficial such that malicious website discovery system 301 does not inadvertently discover more benign websites stemming from a false positive when performing the remainder of operational scenario 500's steps instead of finding more malicious websites as intended.

In operational scenario 700, malicious website discovery system 301 queries 3rd party malicious website service 305 at step 1 with additional domains that may have been found when malicious website discovery system 301 crawled web server systems 303 for page data in steps 2-3 of operational scenario 500. An additional domain may have been found in page data related to a subframe of a requested webpage, may have been identified after a redirection to another page outside of the originally requested page domain (e.g., through simulated page navigation by malicious website discovery system 301), or may be identified in some other manner. Querying 3rd party malicious website service 305 with the additional domains allows malicious website discovery system 301 to confirm which of the additional are known to be malicious to 3rd party malicious website service 305. Those of the additional domains that are not known by 3rd party malicious website service 305 to be malicious are removed from the known malicious domains.

Also, in this example, malicious website discovery system 301 maintains a list of whitelisted domains that malicious website discovery system 301 compares at step 2 to the remaining malicious websites. Any of the malicious websites with domains on the whitelist are removed from the malicious websites by malicious website discovery system 301. Domains on the whitelist may be those domains that are determined to be the most popular (e.g., domains for the top 100,000 most popular websites). Malicious website discovery system 301 may determine which websites are most popular or may use another 3rd party service to indicate which are the most popular websites at any given time.

Even after steps 1 and 2, many of the malicious web sites may still be false positives because they belong to inactive websites, such as those websites that are "parked" by a website hosting service or otherwise showing content from a hosting service rather than potentially malicious content (e.g., an error message from the hosting service indicating that the website has been suspended). Malicious website discovery system 301 may request page data from each of the websites remaining in the malicious websites and identify that the webpage is actually one belonging to a hosting service (e.g., through recognizing the source of the webpage or the content thereon). Any website in the malicious websites determined to be inactive are then also removed from the remaining malicious websites. In some cases, malicious website discovery system 301 may query code search engine 304, or another search engine, asking for a number of websites using the analytics identifiers for the remaining malicious websites. If a particular analytics identifier is being used by more than a threshold number of websites (e.g., 500 domains), malicious website discovery system 301 may assume that analytics identifier is being used by a benign entity, such as a hosting service that by their nature tend to have numerous pages easily indexed by search engines, rather than a malicious actor. Any websites of the malicious websites having an analytics identifier that satisfies the threshold are removed from the malicious websites.

Figure 8:
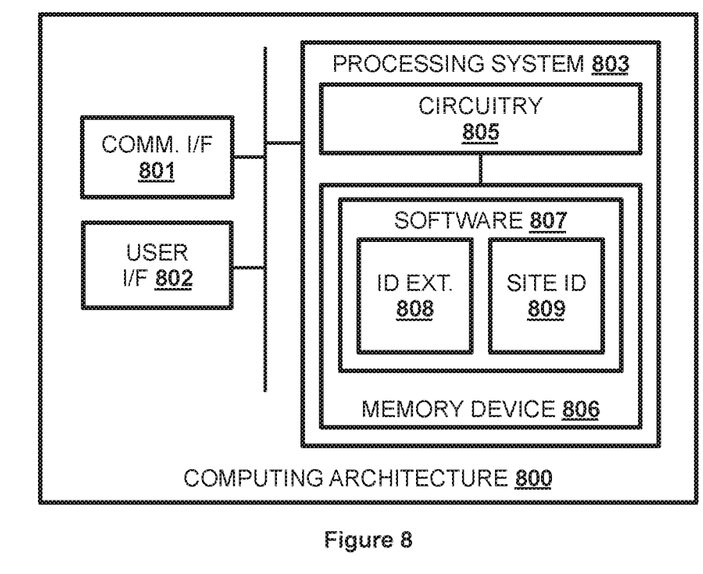
FIG. 8 illustrates a computing architecture to discover malicious websites using web analytics identifiers.

FIG. 8 illustrates computing architecture 800 to automatically authenticate a new network element. Computing architecture 800 is an example computing architecture for new malicious website discovery system 101, although alternative configurations may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises processing circuitry, such as a microprocessor, and other circuitry that retrieves and executes operating software 807 from memory device 806. Memory device 806 comprises a computer readable storage medium, such as a disk drive, flash drive, data storage circuitry, or some other memory apparatus that in no cases should be considered a mere propagated signal. Operating software 807 comprises computer programs, firmware, or some other form of machine-readable processing instructions. Operating software 807 includes identifier extraction module 808 and website identification module 809. Operating software 807 may further include an operating system, utilities, drivers, network interfaces, applications, or some other type of software. When executed by circuitry 805, operating software 807 directs processing system 803 to operate computing architecture 800 as described herein.

In particular, identifier extraction module 808 directs processing system 803 to obtain information about one or more first websites that are known to be malicious. Website identification module 809 directs processing system 803 to identify one or more first analytics identifiers that are each associated with at least one of the first websites and identify one or more second websites that are each associated with at least one of the first analytics identifiers.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of discovering malicious websites using web analytics identifiers, comprising:
    obtaining information about one or more first websites that are known to be malicious;
    identifying one or more first analytics identifiers that are each associated with at least one of the first websites;
    searching source code of a plurality of websites for the first analytics identifiers; and
    identifying one or more second websites that are each associated with at least one of the first analytics identifiers, wherein identifying the one or more second websites comprises identifying the one or more second websites as ones of the plurality of websites having at least one of the first analytics identifiers.

2. The method of claim 1, wherein the second websites are identified by domain names and the method further comprising:
    transferring the domain names to a domain filter that identifies the domain names in network traffic.

3. The method of claim 2, wherein:
    upon identifying one of the domain names in the network traffic, the domain filter provides a notification to a user indicating that the domain name is malicious.

4. The method of claim 2, wherein:
    upon identifying one of the domain names in the network traffic, the domain filter blocks the network traffic associated with the domain name.

5. The method of claim 1, wherein searching source code of the plurality of websites comprises:
    querying a search engine with the first analytics identifiers.

6. The method of claim 1, wherein the information about the first websites includes a domain name for each of the first websites and wherein identifying the first analytics identifiers comprises:
    retrieving source code for the first websites based on the domain name for each of the first web sites; and
    extracting the first analytics identifiers from the source code for the first websites.

7. The method of claim 1, further comprising:
    determining that a first portion of the first websites are whitelisted; and
    removing the first portion from the first websites.

8. The method of claim 1, further comprising:
    determining that a first portion of the first websites are inactive; and
    removing the first portion from the first web sites.

9. The method of claim 8, wherein determining that the first portion of the first websites are inactive comprises:
    determining that each analytics identifier of the first portion is associated with greater than a threshold number of domains.

10. The method of claim 1, further comprising:
    obtaining information about one or more first applications that are known to be malicious;
    identifying one or more second analytics identifiers that are each associated with at least one of the first applications; and
    identifying one or more second applications that are each associated with at least one of the second analytics identifiers.

11. An apparatus comprising:
    one or more non-transitory computer readable storage media;
    a processing system operatively coupled with the one or more computer readable storage media; and
    program instructions stored on the one or more computer readable storage media that, when read and executed by the processing system, direct the processing system to:
    obtain information about one or more first websites that are known to be malicious;
    identify one or more first analytics identifiers that are each associated with at least one of the first websites;
    query a search engine with the first analytics identifiers, wherein the search engine searches source code of a plurality of websites for the first analytics identifiers; and
    based on results of the query, identify one or more second websites of the plurality of websites having at least one of the first analytics identifiers in the source code of the one or more second websites.

12. The apparatus of claim 11, wherein the second websites are identified by domain names and the program instructions further direct the processing system to:
   transfer the domain names to a domain filter that identifies the domain names in network traffic, wherein program instructions for the domain filter are also stored on the one or more computer-readable storage media.

13. The apparatus of claim 12, wherein:
   upon identifying one of the domain names in the network traffic, the domain filter program instructions are executed to direct the processing system to provides a notification to a user indicating that the domain name is malicious.

14. The apparatus of claim 12, wherein:
   upon identifying one of the domain names in the network traffic, the domain filter program instructions are executed to direct the processing system to block the network traffic associated with the domain name.

15. The apparatus of claim 11, wherein the information about the first websites includes a domain name for each of the first websites and wherein to identify the first analytics identifiers, the program instructions direct the processing system to:
   retrieve source code for the first websites based on the domain name for each of the first websites; and
   extract the first analytics identifiers from the source code for the first websites.

16. The apparatus of claim 11, wherein the program instructions further direct the processing system to:
   determine that a first portion of the first websites are whitelisted; and
   remove the first portion from the first websites.

17. The apparatus of claim 11, wherein the program instructions further direct the processing system to:
   determine that a first portion of the first websites are inactive; and
   remove the first portion from the first websites.

18. The apparatus of claim 11, wherein the program instructions further direct the processing system to:
   obtain information about one or more first applications that are known to be malicious;
   identify one or more second analytics identifiers that are each associated with at least one of the first applications; and
   identify one or more second applications that are each associated with at least one of the second analytics identifiers.

19. One or more non-transitory computer readable storage media having program instructions stored thereon for discovering malicious websites using web analytics identifiers, the program instructions, when read and executed by a processing system, direct the processing system to:
   obtain information about one or more first websites that are known to be malicious;
   identify one or more first analytics identifiers that are each associated with at least one of the first websites;
   query a search engine with the first analytics identifiers, wherein the search engine searches source code of a plurality of websites for the first analytics identifiers; and
   based on the results of the query, identify one or more second websites of the plurality of websites having at least one of the first analytics identifiers in the source code of the one or more second websites.

20. The one or more computer-readable storage media of claim 19, wherein the program instructions to identify the one or more first analytics identifiers comprise program instructions that, when executed by the processing system, direct the processing system to interact with the first websites to determine analytics identifiers associated with at least one of linked pages and scripts of the first websites, wherein the first analytics identifiers include the analytics identifiers associated with at least one of linked pages and scripts of the first websites.

* * * * *